(12) United States Patent
Almen

(10) Patent No.: US 7,188,680 B2
(45) Date of Patent: Mar. 13, 2007

(54) HYDRAULICALLY ADJUSTABLE HINGED HITCH

(75) Inventor: Peter D. Almen, Devils Lake, ND (US)

(73) Assignee: Summers Manufacturing Co., Inc., Devils Lake, ND (US)

(*) Notice: Subject to any disclaimer, the term of this patent is extended or adjusted under 35 U.S.C. 154(b) by 56 days.

(21) Appl. No.: 10/773,505

(22) Filed: Feb. 6, 2004

(65) Prior Publication Data

US 2005/0173135 A1 Aug. 11, 2005

(51) Int. Cl.
*A01B 63/14* (2006.01)

(52) U.S. Cl. .......................... 172/397; 172/315; 111/69

(58) Field of Classification Search .............. 172/452, 172/776, 397, 315; 111/69
See application file for complete search history.

(56) References Cited

U.S. PATENT DOCUMENTS

| | | | | |
|---|---|---|---|---|
| 2,780,475 A | * | 2/1957 | Koerner | 280/414.5 |
| 2,786,404 A | * | 3/1957 | Gardner | 172/444 |
| 3,032,903 A | * | 5/1962 | Ede | 37/370 |
| 3,237,577 A | * | 3/1966 | Wilkins | 111/123 |
| 3,658,362 A | * | 4/1972 | Fackler et al. | 280/414.5 |
| 3,812,919 A | * | 5/1974 | Baughman et al. | 172/328 |
| 3,912,019 A | * | 10/1975 | Baughman et al. | 172/691 |
| 3,924,694 A | * | 12/1975 | Baughman et al. | 172/413 |
| 4,180,005 A | * | 12/1979 | Zumbahlen | 111/52 |
| 4,217,962 A | * | 8/1980 | Schaefer | 172/197 |
| 4,490,929 A | * | 1/1985 | Lucas | 37/381 |
| 4,519,460 A | * | 5/1985 | Gust | 172/176 |
| 4,535,849 A | * | 8/1985 | Dietrich, Sr. | 172/468 |
| 4,583,421 A | * | 4/1986 | Rose | 74/586 |
| 4,651,451 A | * | 3/1987 | Beeley et al. | 37/219 |
| 5,086,847 A | * | 2/1992 | Meiners | 172/466 |
| 5,181,573 A | | 1/1993 | Almen | |
| 5,351,634 A | * | 10/1994 | Patton | 111/77 |
| 5,407,014 A | * | 4/1995 | Tranmer | 172/197 |
| 5,669,452 A | * | 9/1997 | Wright et al. | 172/685 |
| 6,125,775 A | * | 10/2000 | Gust | 111/52 |
| 6,293,475 B1 | | 9/2001 | Sobolik | |
| 6,499,543 B1 | * | 12/2002 | Javerlhac | 172/178 |
| 6,505,688 B1 | | 1/2003 | Almen | |

* cited by examiner

*Primary Examiner*—Thomas A Beach
(74) *Attorney, Agent, or Firm*—Hamre, Schumann, Mueller & Larson, P.C.

(57) ABSTRACT

An agricultural implement includes a pivoting assembly, a working assembly, and a tow bar assembly. The working assembly includes a front gang of coulters and a rear gang of coulters. The pivoting assembly includes a hydraulic cylinder. The hydraulic cylinder is adjusted between an extended orientation, a retracted orientation, a floating orientation, and a level orientation. The extended orientation places a greater portion of the weight of the working assembly on the rear gang of coulters. The retracted orientation places a greater portion of the weight of the working assembly on the front gang of coulters. The level orientation locks the hydraulic cylinder so that an equal portion of the weight of the working assembly is placed on the rear and the front gang of coulters. The floating orientation allows the front and the rear gang of coulters to follow the terrain of the land being conditioned.

8 Claims, 4 Drawing Sheets

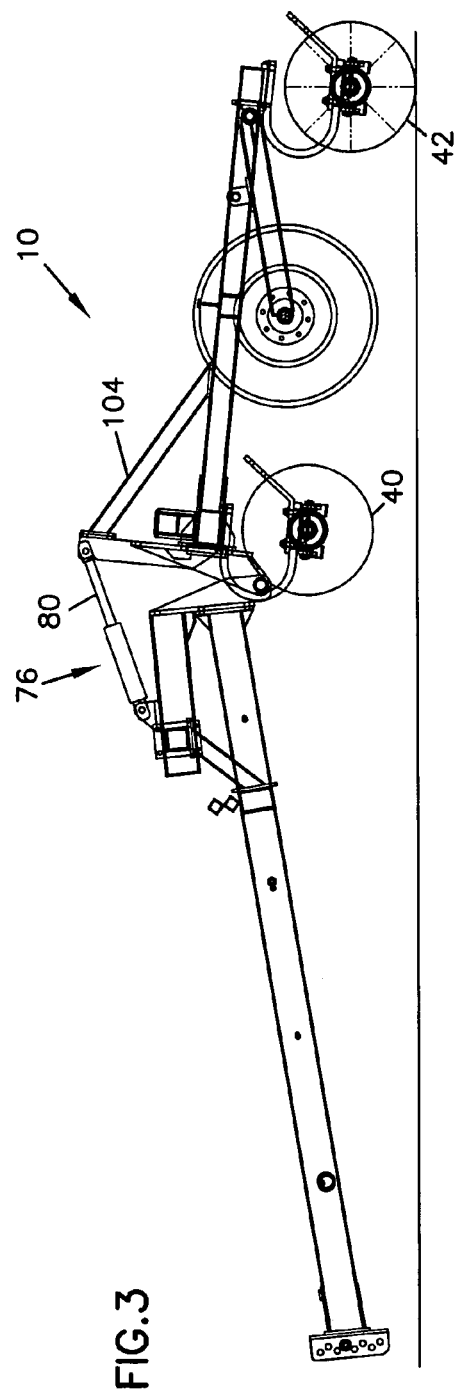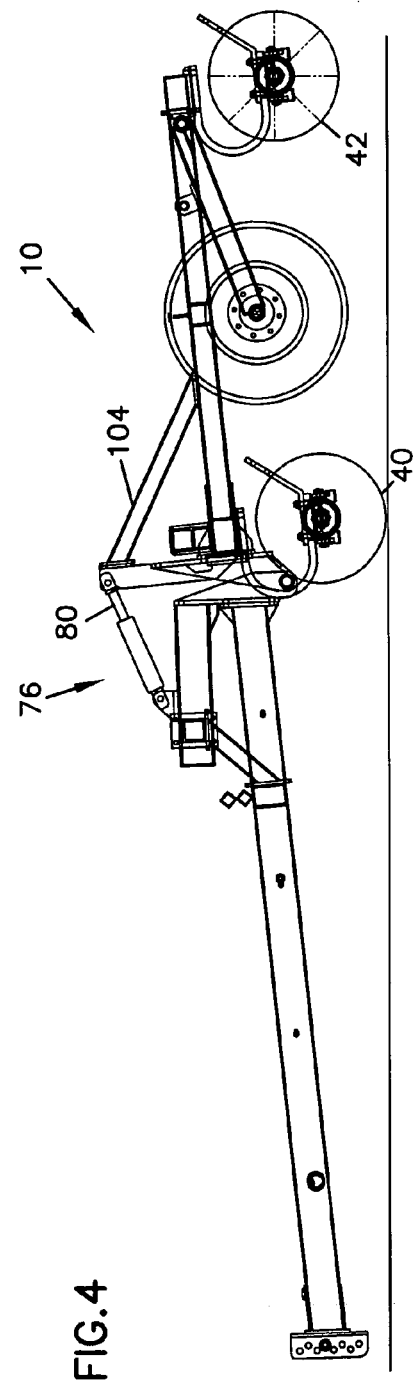
FIG.3
FIG.4

HYDRAULICALLY ADJUSTABLE HINGED HITCH

FIELD OF THE INVENTION

The invention is directed to agricultural implements for soil conditioning, particularly, a tillage implement with front and rear gangs of coulters.

BACKGROUND OF THE INVENTION

A properly prepared seedbed is essential for good crop yields. There are various types of tillage implements known by crop producers for seedbed preparation. Known tillage implements utilize traditional soil working tools, such as discs, sweeps, or shanks, alone or in combination, in varying arrangements. While each of these different soil working tools performs an intended purpose, known tillage implements do not work properly or effectively when ground conditions have hardened so that penetration of the tools is decreased. For example, the soil condition is greatly hardened during the fall of the year.

Known tillage implements work satisfactorily in the spring. The known implements cut and mix residue, for example corn or bean stalks, with the soil, which allows the soil surface to dry sufficiently to permit earlier planting. However, when the soil conditions harden, the known tillage implements tend to create hair pinning. Hair pinning occurs when residue has been forced into the soil, but has not been cut. Hair pinning creates two problems. First, the residue acts like a wick, which increases soil moisture loss. Second, the uncut residue causes machine plugging in future field operations.

Increasing weight per blade by adding ballast to the tillage implement would be cost prohibitive. Furthermore, maintaining the total machine weight and increasing blade spacing to increase the weight per blade is undesirable because it changes the effective spacing used for spring seedbed preparation. In addition, changing the blade spacing is very labor intensive. Thus, a need still exists for reducing hair pinning created by known tillage implements.

SUMMARY OF THE INVENTION

One aspect of the present invention relates to an agricultural implement comprising a tow bar assembly, a working assembly, and a pivoting assembly connecting said tow bar assembly and said working assembly. The working assembly includes a front gang of coulters and a rear gang of coulters. The pivoting assembly operates to transfer weight of the working assembly between the front gang of coulters and the rear gang of coulters.

Another aspect of the invention relates to an agricultural implement comprising a tow bar assembly, a working assembly, a pivoting assembly connecting the tow bar assembly and the working assembly, and a hydraulic cylinder. The working assembly includes a front gang of coulters and a rear gang of coulters and a frame connecting the front gang of coulters and the rear gang of coulters. The working assembly has weight. When the hydraulic cylinder is extended, more of the weight of the working assembly is supported by the rear gang of coulters. When the hydraulic cylinder is retracted, more of the weight of said working assembly is supported by the front gang of coulters.

Another aspect of the invention relates to an agricultural implement comprising a tow bar assembly and a working assembly. The working assembly includes a front gang of coulters and a rear gang of coulters and a frame that connects the front gang of coulters and the rear gang of coulters. The agricultural implement further includes a means for inclining the frame with respect to the tow bar assembly. When the frame is inclined upward in the front relative to a level orientation, more of the weight of the working assembly is supported by the rear gang of coulters. When the frame is inclined downward in the front relative to the level orientation, more of the weight of the working assembly is supported by the front gang of coulters.

BRIEF DESCRIPTION OF THE DRAWINGS

FIG. 3 is a side view of the implement of FIG. 1 in extended mode in accordance with the present invention;

FIG. 4 is a side view of the implement of FIG. 1 in retracted mode in accordance with the present invention;

DISCUSSION OF THE INVENTION

Figure 1:
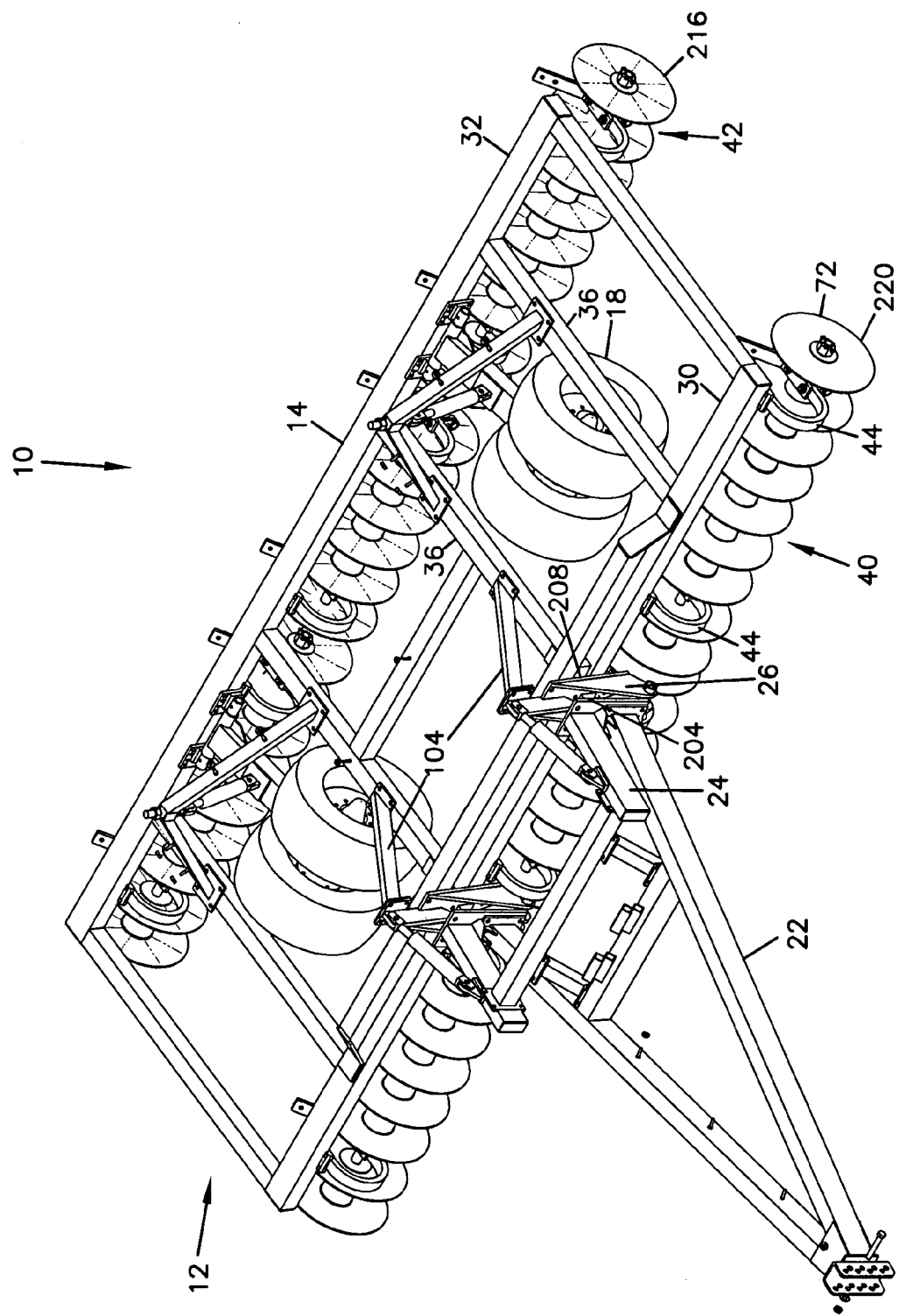
FIG. 1 is a perspective view of an agriculture implement including a hydraulically adjustable hinged hitch in accordance with the present invention.

Referring to the drawings, wherein like reference numerals designate identical or corresponding parts throughout the several views, and more particularly to FIG. 1, an agricultural implement, which is designated generally by the numeral 10, including a hydraulically adjustable hinged hitch in accordance with the present invention is shown. The agricultural implement 10 is adapted to be towed by a vehicle over soil being conditioned prior to planting or conditioned after harvest. The implement includes a working assembly 12 having a plurality of wheel assemblies 18 connected thereto. The working assembly 12, which has weight, includes a frame 14. A tow bar assembly 22 is provided for connecting the implement 10 to the towing vehicle. The tow bar assembly 22 extends from a pivoting assembly 26 that connects the working assembly 12 and the tow bar assembly 22. While the implement shown in FIG. 1 depicts only a center section, it is understood that the implement could also include wing sections constructed and operated similar to the center section.

The frame 14 of the implement 10 includes a pair of spaced-apart bars 30 and 32 running transverse to the direction of travel of the implement 10. The frame 14 further includes a plurality of members 36 that are attached to and extend between bars 30 and 32 to provide a rectangular framework.

The wheel assemblies 18 of the implement 10 are attached to the working assembly 12 in a known fashion using dependant brackets in conjunction with bearings, axles, wheels, and appropriate connecting and other hardware. The wheel assemblies 18 may be connected to any part of the working assembly 12 as appropriate, including bars 30 and 32, and members 36 as shown in FIG. 1.

The working assembly 12 includes two gangs of coulters 40 and 42, which are attached to the frame 14 using spring shank assemblies 44. The gangs of coulters 40 and 42 may be attached using any connecting or other hardware. A plurality of spring shank assemblies 44 are provided for each gang of coulters 40 and 42. The two gangs of coulters are further described as a front gang of coulters 40 and a rear gang of coulters 42, which are substantially parallel relative to each other. The front gang of coulters 40 is closest in proximity to the towbar assembly 22.

Each gang of coulters 40 and 42 includes several blades 72. Exemplary blades include straight blades 220 or wave blades 216. In an embodiment, the rear gang of coulters 42 includes wave blades 216 and the front gang of coulters includes straight blades 220. Blades 72, for example, are about 22 inches in diameter and spaced about 10 inches apart. The rear gang blades 72 are positioned midway between the front gang blades 72. This exemplary positioning allows for an effective cutting width of about 5 inches.

Figure 5:
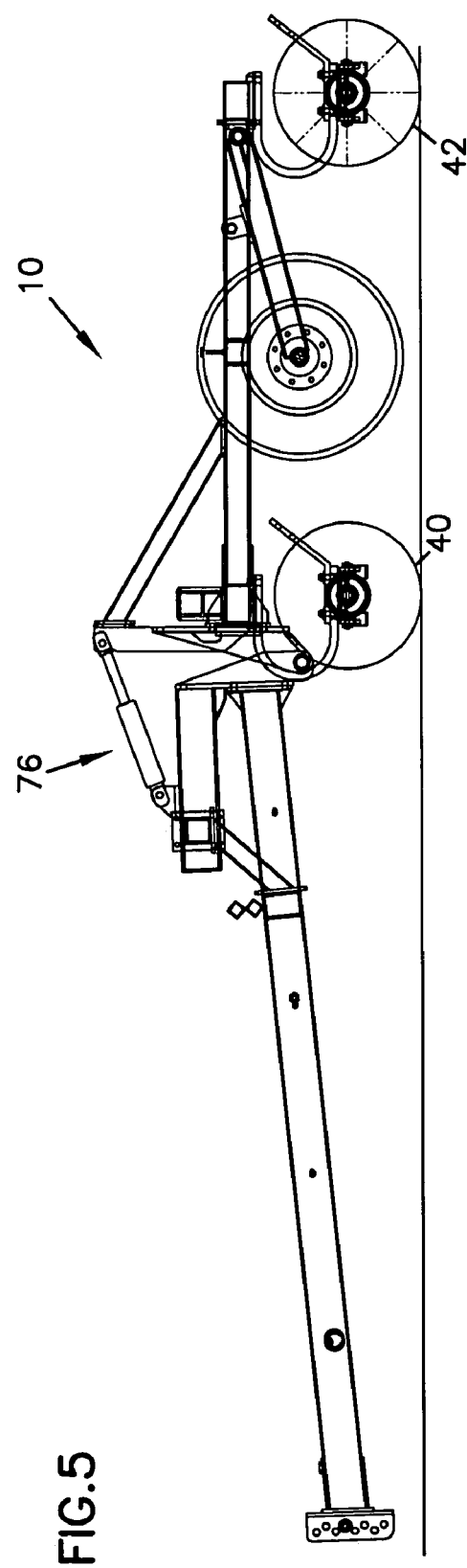
FIG. 5 is a side view of the implement of FIG. 1 in either flotation mode or level mode.

In an embodiment, the pivoting assembly 26 includes a hydraulic cylinder 76, as seen in FIGS. 2–5, for hydraulically moving the working assembly 12 between the extended orientation (shown in FIG. 3), the retracted orientation (shown in FIG. 4), the floating orientation (shown in FIG. 5), and the level orientation (shown in FIG. 5). An exemplary agricultural implement 10 requires two pivoting assemblies 26. In another embodiment, the pivoting assembly includes a manually, electrically, or hydraulically operated adjustable threaded link for moving the working assembly 12 between the extended orientation (shown in FIG. 3), the retracted orientation (shown in FIG. 4), the floating orientation (shown in FIG. 5), and the level orientation (shown in FIG. 5). The pivoting assembly can include any means for moving the working assembly between the various orientations listed directly above.

Figure 2:
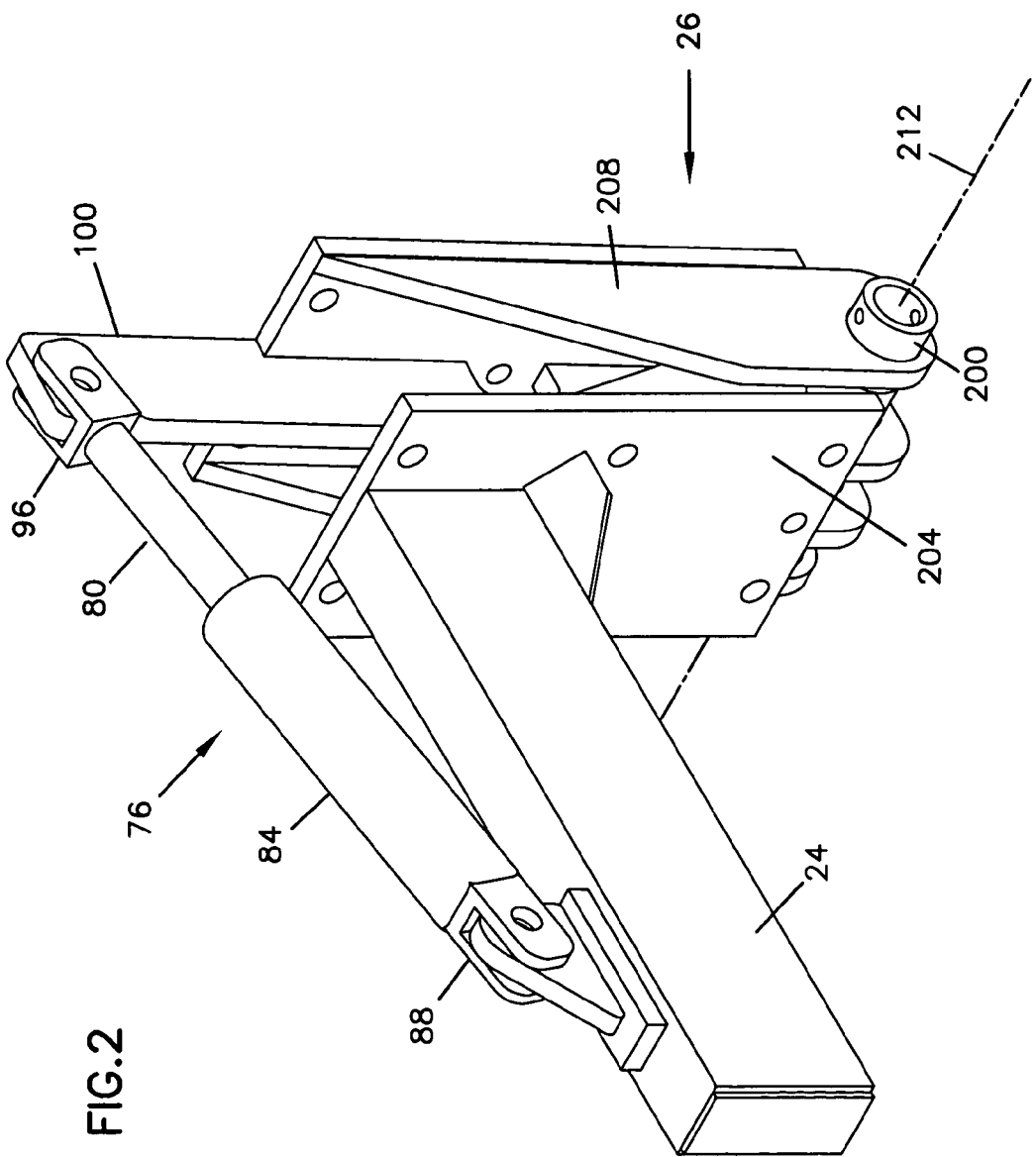
FIG. 2 is a perspective view of a pivoting assembly of the implement of FIG. 1 in accordance with the present invention.

As shown in FIG. 2, the hydraulic cylinder 76 includes a piston structure 80 that is reciprocally mounted within a cylinder portion 84. The base end 88 of the cylinder portion 84 is pivotally connected to a cylinder bracket 24 of the pivoting assembly 26. The cylinder bracket 24 is connected to a pivoting cylinder brace 204.

As shown in FIGS. 1–5, a free end 96 of the piston structure 80 is pivotally connected to a piston bracket 100. The piston bracket 100 is connected to an extending bracket 104 of the working assembly 22. The extending bracket 104 is connected to a member 36 of the frame 14. The piston bracket 100 also is connected to a pivoting piston brace 208 of the pivoting assembly.

A pivoting portion 200 interconnects the pivoting cylinder brace 204 and the pivoting piston brace 208. The pivoting portion 200 allows both the pivoting cylinder brace 204 and the pivoting piston brace 208 to pivot about a horizontal axis 212 in relation to movement of the hydraulic cylinder.

Any known hydraulic control system can be used in conjunction with a hydraulic power system to operate the movement of the hydraulic cylinder 76 of the pivoting assembly 26. Typically, the hydraulic power system is provided as part of a vehicle (e.g., a tractor) used to pull or otherwise move the agricultural implement 10.

In use, the agricultural implement 10 is pulled behind a tractor or other towing vehicle. The implement 10 as designed can be used in either the fall or the spring of the year. In the spring, the implement 10 allows farmers to lightly till wet fields covered with high amounts of residue. The implement will cut and mix residue with the soil allowing the soil surface to dry enough to allow earlier planting. The cutting is done with both the front and rear coulter blades.

However, as the soil conditions harden, usually in the fall, the coulter blade penetration is reduced. Transferring the weight of the working assembly 12 to the rear or the front gang of coulters 40 and 42 increases the weight per blade allowing the blade penetration to be increased to an effective depth. For example, by transferring all of the weight of the working assembly 12 to the rear gang of coulters 42, the weight per blade is nearly doubled. Another example, by transferring all of the weight of the working assembly 12 to the front gang of coulters 40, the weight per blade is more than doubled.

For a typical implement, the weight per blade of the implement 10 is about 210 pounds when the implement is operated in flotation or level mode, as shown in FIG. 5. The implement's weight per blade when all the of the weight of the working assembly 12 is placed on the front gang of coulters 40, as shown in FIG. 4, is about 470 pounds. The implement's weight per blade when all of the weight of the working assembly 12 is placed on the rear gang of coulters 42, as shown in FIG. 3, is about 370 pounds. Of course, these weights would be different depending on the particular implement.

The penetration and cutting ability of the blades of the agricultural implement is increased during individual gang of coulter use, e.g. extended mode, retracted mode. The effective spacing is increased during individual gang of coulter use. For example, the effective spacing is increased from about 5 inches to about 10 inches when the agricultural implement is switched from two gang of coulter use to individual gang of coulter use. However, once the field has been tilled using the individual row of coulters 40 or 42, the implement can be placed in flotation mode to work the field again with an effective spacing of about 5 inches. The weight of the working assembly 12 could also be equally placed on each gang of coulters 40 and 42 by hydraulically locking the hydraulic cylinder in the appropriate position, the level orientation.

As shown in FIG. 3, the hydraulic cylinder 76 is extended to place the agricultural implement 10 in extended mode. The extension of the hydraulic cylinder 76 causes the pivoting assembly 26 to pivot about the pivoting portion 200. The extension of the hydraulic cylinder transfers a greater portion of the weight of the working assembly 12 to the rear gang of coulters 42. The weight per blade 72 of the rear gang of coulters can be adjusted between 0 pounds and about 370 pounds by adjusting the extension of the hydraulic cylinder 76. The more the hydraulic cylinder 76 is extended, the greater the weight transfer to the rear gang of coulters 42.

As shown in FIG. 4, the hydraulic cylinder 76 is retracted to place the agricultural implement 10 in retracted mode. The retraction of the hydraulic cylinder 76 causes the pivoting assembly 26 to pivot about the pivoting portion 200. The retraction of the hydraulic cylinder transfers a greater portion of the weight of the working assembly 12 to the front gang of coulters 42. The weight per blade 72 of the front gang of coulters can be adjusted between 0 pounds and about 470 pounds by adjusting the retraction of the hydraulic cylinder 76. The more the hydraulic cylinder 76 is retracted, the greater the weight transfer to the front gang of coulters 42.

As shown in FIG. 5, the hydraulic cylinder 76 is either locked so that equal weight is placed on the front and the rear gang of coulters 40 and 42 or allowed to float. The agricultural implement 10 is operated in level mode when the hydraulic cylinder 76 is locked so that equal weight of the working assembly 12 is placed on the front and the rear gang of coulters 40 and 42.

The agricultural implement 12 is operated in flotation mode when the hydraulic cylinder is allowed to float or move in response to the terrain of the land being conditioned. The flotation mode allows the front and the rear gang of coulters 40 and 42 of the agricultural implement 10 to follow the terrain of the land.

Thus, the embodiment of the apparatus in accordance with the present invention has been described in detail. In this regard, it is understood, however, that the disclosure is exemplary and that equivalents are possible. Therefore, it is further understood that changes made, especially in matters of shape, size, and arrangement to the full extent extended by the general meaning of the terms in which the appended claims are expressed, are within the principle of the invention.

I claim:

1. An agricultural implement for being pulled by a powered vehicle, comprising:
   a tow bar assembly connected to said powered vehicle;
   a working assembly having a front gang of coulters and a rear gang of coulters; and
   a pivoting assembly connecting said tow bar assembly and said working assembly, said pivoting assembly being operable to transfer weight of said working assembly between said front gang of coulters and said rear gang of coulters, the pivoting assembly including a hydraulic cylinder, the pivoting assembly further including a pivoting piston brace, a pivoting cylinder brace, and a pivoting portion connecting the pivoting piston brace and the pivoting cylinder brace, the pivoting portion being operable with said hydraulic cylinder to pivot said pivoting piston brace and said pivoting cylinder brace with respect to one another about a horizontal axis.

2. An agricultural implement for being pulled by a powered vehicle according to claim 1, wherein the front gang of coulters and rear gang of coulters comprises blades.

3. An agricultural implement for being pulled by a powered vehicle according to claim 1, wherein the front gang of coulters and the rear gang of the coulters are substantially parallel to each other.

4. An agricultural implement for being pulled by a powered vehicle according to claim 2, wherein the rear gang blades are positioned midway between the front gang blades.

5. An agricultural implement for being pulled by a powered vehicle, comprising:
   a tow bar assembly wherein said implement is pulled by said powered vehicle;
   a working assembly having a front gang of coulters, a rear gang of coulters, and a frame connecting said front gang of coulters and said rear gang of coulters, said working assembly having weight;
   a pivoting assembly connecting said tow bar assembly and said working assembly, said pivoting assembly including a hydraulic cylinder connected between said tow bar assembly and said working assembly to pivot said frame with respect to said tow bar assembly, wherein when said bydraulic cylinder is extended, more of the weight of said working assembly is supported by said rear gang of coulters, and when said hydraulic cylinder is retracted, more of the weight of said working assembly is supported by said front gang of coulters.

6. An agricultural implement for being pulled by a powered vehicle according to claim 5, wherein the pivoting assembly further comprises a pivoting piston brace, a pivoting cylinder brace, and the pivoting portion connecting the pivoting piston brace and the pivoting cylinder brace, the pivoting portion being operable to pivot about a horizontal axis.

7. An agricultural implement for being pulled by a powered vehicle, comprising:
   a tow bar assembly connected to said powered vehicle;
   a working assembly having a front gang of coulters and a rear gang of coulters and a frame connecting said front gang of coulters and said rear gang of coulters, said working assembly having weight, said frame having a level orientation when said frame is level relative to said tow bar assembly;
   means for inclining said frame with respect to said tow bar assembly wherein when said frame is inclined upward in front relative to said level orientation, more of the weight of said working assembly is supported by said rear gang of coulters, and when said frame is inclined downward in front relative to said level orientation, more of the weight of said working assembly is supported by said rear gang of coulters, said inclining means including a pivoting piston brace, a pivoting cylinder brace, and a pivoting portion connecting the pivoting piston brace and the pivoting cylinder brace, said inclining means being operable to pivot said pivoting piston brace and said pivoting cylinder brace with respect to one another.

8. An agricultural implement for being pulled by a power vehicle according to claim 7, wherein the front gang of coulters and the rear gang of coulters are substantially parallel to each other.

* * * * *